US012810796B2

(12) United States Patent
Du et al.

(10) Patent No.: US 12,810,796 B2
(45) Date of Patent: Nov. 24, 2026

(54) PIXEL DRIVE CIRCUIT AND DRIVE METHOD THEREFOR, AND DISPLAY PANEL AND DISPLAY APPARATUS

(71) Applicants: Chengdu BOE Optoelectronics Technology Co., Ltd., Chengdu (CN); BOE Technology Group Co., Ltd., Beijing (CN)

(72) Inventors: Mengmeng Du, Beijing (CN); Yao Huang, Beijing (CN); Xiangdan Dong, Beijing (CN); Rui Hou, Beijing (CN)

(73) Assignees: CHENGDU BOE OPTOELECTRONICS TECHNOLOGY CO., LTD., Chengdu (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/992,572

(22) PCT Filed: Aug. 18, 2023

(86) PCT No.: PCT/CN2023/113860

§ 371 (c)(1),
(2) Date: Jan. 9, 2025

(87) PCT Pub. No.: WO2024/060902

PCT Pub. Date: Mar. 28, 2024

(65) Prior Publication Data

US 2026/0065858 A1 Mar. 5, 2026

(30) Foreign Application Priority Data

Sep. 19, 2022 (CN) ........................ 202211139247.2

(51) Int. Cl.
*G09G 3/3233* (2016.01)

(52) U.S. Cl.
CPC ... *G09G 3/3233* (2013.01); *G09G 2300/0819* (2013.01); *G09G 2310/08* (2013.01);
(Continued)

(58) Field of Classification Search
CPC ..... G09G 2320/0233; G09G 2320/045; G09G 2320/0626; G09G 2320/043;
(Continued)

(56) References Cited

U.S. PATENT DOCUMENTS 11,170,719 B1 11/2021 Lu et al.
2008/0238955 A1* 10/2008 Yamashita ........... G09G 3/3266 345/698

(Continued)

FOREIGN PATENT DOCUMENTS

CN 101127183 2/2008
CN 100481513 C 4/2009

(Continued)

OTHER PUBLICATIONS

International Search Report issued Aug. 17, 2023 in International Patent Application No. PCT/CN2022/134737 with English translation thereof.

(Continued)

*Primary Examiner* — Dong Hui Liang
(74) *Attorney, Agent, or Firm* — XSENSUS LLP

(57) ABSTRACT

A pixel drive circuit and a drive method therefor, and a display panel and a display apparatus. The pixel drive circuit includes a drive circuit and a first control circuit, wherein the drive circuit is connected to a first node, a second node and a third node, and the drive circuit is used for providing, in response to a voltage signal of the first node, a drive current by using a voltage difference between the second node and the third node; and the first control circuit is connected to the second node, a first power source end and an enable signal
(Continued)

end, and the first control circuit is used for transmitting a voltage signal of the first power source end to the second node in response to a signal of the enable signal end.

15 Claims, 11 Drawing Sheets

(52) U.S. Cl.
CPC ............... *G09G 2320/0233* (2013.01); *G09G 2320/064* (2013.01)

(58) Field of Classification Search
CPC ... G09G 2320/0242; G09G 2320/0276; G09G 2320/0271; G09G 2320/0673; G09G 3/3233; G09G 3/32; G09G 3/3208; G09G 3/3266; G09G 3/3225; G09G 3/3258; G09G 3/2022; G09G 3/3291; G09G 3/2074; G09G 2300/0819; G09G 2300/0842; G09G 2300/0426; G09G 2300/0861; G09G 2300/0852; G09G 2310/08; G09G 2310/0251; G09G 2310/027; G09G 2310/0262
See application file for complete search history.

(56) References Cited

U.S. PATENT DOCUMENTS

| | | | | |
|---|---|---|---|---|
| 2011/0164016 | A1 | 7/2011 | Kang et al. | |
| 2013/0335399 | A1 | 12/2013 | Tsuge | |
| 2014/0111490 | A1 | 4/2014 | Lee et al. | |
| 2015/0243203 | A1 | 8/2015 | Kim et al. | |
| 2016/0133185 | A1* | 5/2016 | Yoon | G09G 3/3233 345/76 |
| 2016/0343278 | A1* | 11/2016 | Tsujita | G09G 3/3275 |
| 2017/0092199 | A1* | 3/2017 | Park | G09G 3/3258 |
| 2017/0270867 | A1 | 9/2017 | Zhu et al. | |
| 2018/0082652 | A1 | 3/2018 | Lv et al. | |
| 2019/0035322 | A1* | 1/2019 | Kim | H10D 86/60 |
| 2020/0066212 | A1 | 2/2020 | Kim et al. | |
| 2020/0168156 | A1 | 5/2020 | Yin | |
| 2021/0125547 | A1 | 4/2021 | Lin et al. | |
| 2022/0101777 | A1 | 3/2022 | Kim et al. | |
| 2022/0115485 | A1 | 4/2022 | Yu | |
| 2022/0208094 | A1* | 6/2022 | Jang | G09G 3/3258 |
| 2022/0351671 | A1 | 11/2022 | Xu et al. | |
| 2023/0386376 | A1* | 11/2023 | Kim | G09G 3/006 |
| 2023/0419896 | A1 | 12/2023 | Zhang | |

FOREIGN PATENT DOCUMENTS

| | | | |
|---|---|---|---|
| CN | 101908316 | A | 12/2010 |
| CN | 102930822 | A | 2/2013 |
| CN | 104575379 | A | 4/2015 |
| CN | 104599637 | A | 5/2015 |
| CN | 104700778 | A | 6/2015 |
| CN | 106297662 | A | 1/2017 |
| CN | 205984242 | | 2/2017 |
| CN | 106531074 | A | 3/2017 |
| CN | 107068060 | A | 8/2017 |
| CN | 108520726 | | 9/2018 |
| CN | 109872692 | A | 6/2019 |
| CN | 110428778 | A | 11/2019 |
| CN | 110675829 | A | 1/2020 |
| CN | 111145693 | A | 5/2020 |
| CN | 111179836 | A | 5/2020 |
| CN | 112687189 | | 4/2021 |
| CN | 112885850 | A | 6/2021 |
| CN | 113506540 | A | 10/2021 |
| CN | 113744683 | A | 12/2021 |
| CN | 113838421 | A | 12/2021 |
| CN | 215265531 | | 12/2021 |
| CN | 114175257 | A | 3/2022 |
| CN | 114241977 | A | 3/2022 |
| CN | 114241978 | A | 3/2022 |
| CN | 114255708 | | 3/2022 |
| CN | 114664253 | A | 6/2022 |
| CN | 114708838 | A | 7/2022 |
| CN | 114783357 | A | 7/2022 |
| JP | 2003-114657 | | 4/2003 |
| JP | 2010-197544 | | 9/2010 |
| JP | 2016-027364 | A | 2/2016 |
| JP | 2017-120375 | A | 7/2017 |
| KR | 20210131852 | A | 11/2021 |

OTHER PUBLICATIONS

Written Opinion issued Aug. 17, 2023 in International Patent Application No. PCT/CN2022/134737 with English translation thereof.
International Search Report issued Nov. 9, 2023 in International Patent Application No. PCT/CN2023/110336 with English translation thereof.
Written Opinion issued Nov. 9, 2023 in International Patent Application No. PCT/CN2023/110336 with English translation thereof.
International Search Report issued Nov. 10, 2023 in International Patent Application No. PCT/CN2023/113860 with English translation thereof.
Written Opinion issued Nov. 10, 2023 in International Patent Application No. PCT/CN2023/113860 with English translation thereof.
Extended European Search Report issued Apr. 16, 2025 in European Patent Application No. 23867136.6.
Supplementary European Search Report mailed on Aug. 20, 2025, and Communication pursuant to Rules 70(2) and 70a(2) EPC mailed on Sep. 9, 2025, in European Application No. 23896249.2, 24 pages.
Non-Final Rejection issued Aug. 1, 2025, in U.S. Appl. No. 18/857,165 total 31 pages.
Non-Final Rejection issued Aug. 19, 2025, in U.S. Appl. No. 18/695,638 total 31 pages.
Non-Final Rejection issued Oct. 7, 2025, in U.S. Appl. No. 18/874,562 total 21 pages.
Office Action issued on Nov. 12, 2025, in related U.S. Appl. No. 18/857,165, 27 pages.
First Office Action mailed on Sep. 10, 2026, received for CN Application 202310945657.4, 20 pages including English Translation.
First Office Action mailed on Oct. 8, 2026, received for CN Application 202380009870.2, 21 pages including English Translation.

* cited by examiner

PIXEL DRIVE CIRCUIT AND DRIVE METHOD THEREFOR, AND DISPLAY PANEL AND DISPLAY APPARATUS

CROSS-REFERENCE TO RELATED APPLICATIONS

The present disclosure is a U.S. National Stage of International Application No. PCT/CN2023/113860, filed on Aug. 18, 2023, which claims priority to Chinese patent application number 202211139247.2 filed on Sep. 19, 2022, entitled "Pixel drive circuit and drive method therefor, and display panel, and display apparatus", both of which are incorporated herein by reference in their entireties for all purposes.

TECHNICAL FIELD

The present disclosure relates to the field of display technology, and in particular to a pixel driving circuit and a driving method therefor, a display panel, and a display device.

BACKGROUND

The Organic Light Emitting Diode (OLED) is an active light-emitting display device with the advantages of self-luminescence, wide viewing angle, high contrast, low power consumption, extremely high response speed, lightness, and flexibility. At present, the application of OLED display screens is becoming more and more extensive. In the related art, OLED display screens have the problem of poor uniformity of low grayscale display.

It should be noted that the information disclosed in the above background technology section is only used to enhance the understanding of the background of the present disclosure, and therefore may include information that does not constitute prior art known to those skilled in the art.

SUMMARY

According to an aspect of the present disclosure, there is provided a pixel driving circuit, including a driving circuit, connected to a first node, a second node and a third node, wherein the driving circuit is configured to provide a driving current using a voltage difference between the second node and the third node in response to a voltage signal at the first node; and a first control circuit, connected to the second node, a first power supply terminal and an enable signal terminal, wherein the first control circuit is configured to transmit a voltage signal at the first power supply terminal to the second node in response to a signal at the enable signal terminal.

According to a second aspect of the present disclosure, there is provided a method for driving the pixel driving circuit according to any of embodiments of the present disclosure, including: in a light-emitting stage, providing an activation level signal with a preset duty cycle to the enable signal terminal to control a preset duration of activation of the first control circuit, transmitting the signal at the first power supply terminal to the second node by the first control circuit, and controlling the driving circuit to provide the driving current by using the voltage difference between the second node and the third node.

In an embodiment of the present disclosure, the method includes: in an initialization stage, transmitting the signal at the first initial signal terminal to the third node by the first reset circuit, and transmitting the signal at the second initial signal terminal to the first node by the second reset circuit; in a data writing stage, transmitting the signal at the data signal terminal to the first node by the data writing circuit; and in a light-emitting stage, controlling the first control circuit to be activated for a preset duration, transmitting the signal at the first power supply terminal to the second node by the first control circuit, and controlling the drive circuit to provide the driving current by using the voltage difference between the second node and the third node.

According to a third aspect of the present disclosure, there is provided a display panel, including a plurality of pixel driving circuits according to any of embodiments of the present disclosure, wherein the plurality of pixel driving circuits are distributed in an array along a first direction and a second direction, the pixel driving circuit includes a fifth transistor and a driving transistor, a first electrode of the fifth transistor is connected to the second node, a second electrode of the fifth transistor is connected to the first power supply terminal, and a gate of the fifth transistor is connected to the enable signal terminal; a first electrode of the driving transistor is connected to the second node; the pixel driving circuit is configured to drive a light-emitting unit to emit light; the display panel further includes: a substrate; an active layer, located on a side of the substrate, wherein the active layer includes: a third active portion, wherein an orthographic projection of the third active portion on the substrate extends along the second direction, and the third active portion is configured to form a channel region of the driving transistor; a fifth active portion, located on a side of the third active portion and configured to form a channel region of the fifth transistor; a fifteenth active portion, connected between the third active portion and the fifth active portion, and configured to form the first electrode of the driving transistor and the first electrode of the fifth transistor; and a sixteenth active portion, connected to a side of the fifth active portion away from the fifteenth active portion, and configured to form the second electrode of the fifth transistor; a third conductive layer located on a side of the active layer away from the substrate, wherein the third conductive layer includes: a first conductive portion arranged corresponding to the third active portion, wherein an orthographic projection of the first conductive portion on the substrate covers the orthographic projection of the third active portion on the substrate, and the first conductive portion is configured to form a gate of the driving transistor; a first enable signal line, wherein an orthographic projection of the first enable signal line on the substrate extends along the first direction and covers an orthographic projection of the fifth active portion on the substrate, and a part of a structure of the first enable signal line is configured to form a top gate of the fifth transistor; and a fourth conductive layer located on a side of the third conductive layer away from the substrate, wherein the fourth conductive layer includes: a first power line, wherein an orthographic projection of the first power line on the substrate extends along the second direction and intersects with an orthographic projection of the sixteenth active portion on the substrate, and the first power line is connected to the sixteenth active portion at a corresponding position through a via hole.

According to a fourth aspect of the present disclosure, there is provided a display device, including the display panel according to any of embodiments of the present disclosure.

It should be understood that the above general description and the detailed description below are only exemplary and explanatory, and cannot limit the present disclosure.

BRIEF DESCRIPTION OF THE DRAWINGS

The drawings herein are incorporated into the specification and constitute a part of the specification, showing embodiments consistent with the present disclosure, and together with the specification, are used to explain the principles of the present disclosure. Obviously, the drawings described below are only some embodiments of the present disclosure, and for those skilled in the art, other drawings can be obtained based on these drawings without inventive work.

DETAILED DESCRIPTION

Figure 1:
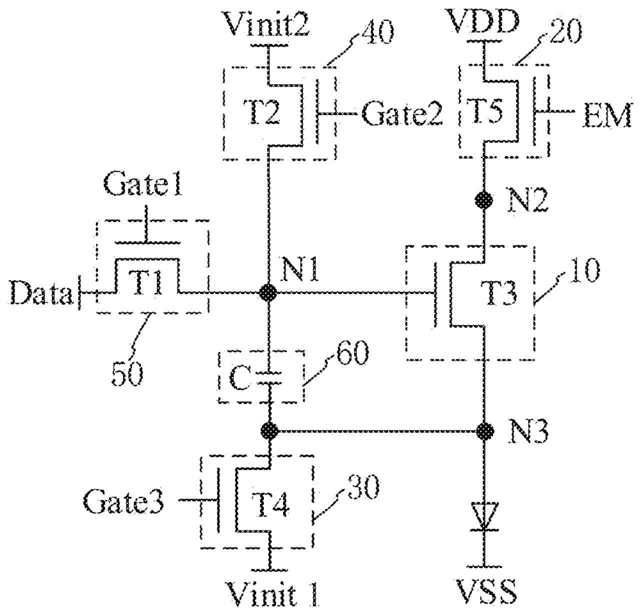
FIG. 1 is a schematic diagram of a structure of a pixel driving circuit according to an embodiment of the present disclosure.

Example embodiments will now be described more fully with reference to the accompanying drawings. However, example embodiments can be implemented in a variety of forms and should not be construed as limited to the embodiments set forth herein; rather, these embodiments are provided so that the present disclosure will be comprehensive and complete and the concepts of the example embodiments will be fully conveyed to those skilled in the art. The same reference numerals in the figures represent the same or similar structures, and their detailed descriptions will be omitted. In addition, the drawings are only schematic illustrations of the present disclosure and are not necessarily drawn to scale.

Although relative terms such as "upper" and "lower" are used in this specification to describe the relative relationship of one component of the icon to another component, these terms are used in this specification only for convenience, for example according to the direction of the examples described in the drawings. It is understood that if the device of the icon is flipped so that it is upside down, the component described as "upper" will become the component "lower". When a structure is "on" another structure, it may mean that a structure is formed integrally on the other structure, or that a structure is "directly" set on the other structure, or that a structure is "indirectly" set on the other structure through another structure.

The terms "a", "an", "the", "the" and "at least one" are used to indicate the presence of one or more elements/components/etc.; the terms "including" and "having" are used to indicate an open-ended inclusion and mean that there may be other elements/components/etc. in addition to the listed elements/components/etc.; the terms "first", "second" and "third" are used only as labels and are not intended to limit the number of their objects.

FIG. 1 is a schematic diagram of a structure of a pixel driving circuit according to an embodiment of the present disclosure. As shown in FIG. 1, the pixel driving circuit may include a driving circuit 10 and a first control circuit 20. The driving circuit 10 is connected to a first node N1, a second node N2 and a third node N3. The driving circuit 10 may be configured to provide a driving current using a voltage difference between the second node N2 and the third node N3 in response to a voltage signal at the first node N1. The first control circuit 20 is connected to the second node N2, the first power supply terminal VDD and the enable signal terminal EM. The first control circuit 20 may be configured to transmit a voltage signal at the first power supply terminal VDD to the second node N2 in response to a signal at the enable signal terminal EM.

In the pixel driving circuit provided by the present disclosure, by providing the first control circuit 20 between the second node N2 and the first power supply terminal VDD, the first control circuit 20 can provide a voltage signal at the first power supply terminal VDD to the second node N2 in response to the signal at the enable signal terminal EM, thereby adjusting the duration of providing the voltage signal by the first power supply terminal VDD to the second node N2 by adjusting the conduction duration of the enable signal, so that the pixel driving circuit has a PWM function, which can improve the display uniformity of the display panel at low grayscale and improve the display quality.

Since the pixel driving circuit in the present disclosure has the first control circuit 20, by adjusting the duty ratio of the activation level of the enable signal at the enable signal terminal EM, the refresh rate of the image to be displayed can be adjusted, thereby improving the display uniformity of the display panel. For example, if the current picture to be displayed is a low grayscale display, the driver integrated circuit DIC can increase the grayscale voltage based on the grayscale voltage corresponding to the current grayscale value, that is, use a higher grayscale voltage to display the current low grayscale picture. At the same time, the driver integrated circuit DIC can reduce the duty cycle of the activation level at the enable signal terminal EM to reduce the refresh rate of the current picture, thereby improving the display uniformity of the display panel at low grayscale by combining the adjustment of the grayscale voltage and the adjustment of the refresh rate. It can be seen that the pixel driving circuit of the present disclosure can control the driving current provided by the driving transistor through the first control circuit 20, which provides the possibility of adjusting the driving current. It should be understood that in other embodiments, the first control circuit 20 can further be configured to improve the display uniformity in other ways, which will not be described in detail here.

As shown in FIG. 1, in an example embodiment, the driving circuit 10 and the first control circuit 20 can be implemented by transistors. For example, the driving circuit 10 may include a driving transistor T3. A first electrode of the driving transistor T3 is connected to the second node N2, a second electrode of the driving transistor T3 is connected to the third node N3, and a gate of the driving transistor T3 is connected to the first node N1. The driving transistor T3 can be configured to provide a driving current using the voltage difference between the second node N2 and the third node N3 in response to the voltage signal at the first node N1. The first control circuit 20 may include a fifth transistor T5. A first electrode of the fifth transistor T5 is connected to the second node N2, a second electrode of the fifth transistor T5 is connected to the first power supply terminal VDD, and a gate of the fifth transistor T5 is connected to the enable signal terminal EM. The fifth transistor T5 can be configured to transmit the voltage signal at the first power supply terminal VDD to the second node N2 in response to the signal at the enable signal terminal EM. For example, in the light-emitting stage, the fifth transistor T5 is turned on under the control of the enable signal output by the enable signal terminal EM, so that the voltage signal at the first power supply terminal VDD is transmitted to the second node N2. The driving transistor T3 is turned on under the control of the voltage signal at the first node N1, so that the driving transistor T3 can use the voltage difference between the second node N2 and the third node N3 to provide a driving current to the light-emitting device connected thereto, and drive the light-emitting device to emit light. In this example embodiment, since there is a fifth transistor T5 between the first power supply terminal VDD and the second node N2, the duty cycle of the signal at the enable signal terminal EM applied to the gate of the fifth transistor T5 can be adjusted, and in a frame of data, the duty cycle of the turn-on time of the fifth transistor T5 in a frame of data can be controlled, so that the driving current can be PWM-regulated, and thus the pixel driving circuit provided by the present disclosure can actively adjust the grayscale brightness of the light-emitting device, thereby improving the problem of poor uniformity of the display panel at low grayscale.

As shown in FIG. 1, in an example embodiment, the driving transistor T3 and the fifth transistor T5 can both be N-type transistors. For example, they can all be N-type oxide thin film transistors, which can reduce the leakage effect of the first node N1 and the second node N2. Thus, it helps to ensure the voltage stability of the above main nodes of the driving circuit 10 at a low refresh frequency. Of course, in other embodiments, the driving circuit 10 and the first control circuit 20 can also be implemented by other circuits.

As shown in FIG. 1, in an example embodiment, the pixel driving circuit may further include a first reset circuit 30, a second reset circuit 40, a data writing circuit 50 and a coupling circuit 60. The first reset circuit 30 is connected to the third node N3, the third gate signal terminal Gate3 and the first initial signal terminal Vinit1. The first reset circuit 30 can be configured to transmit the signal at the first initial signal terminal Vinit1 to the third node N3 in response to the signal at the third gate signal terminal Gate3. The second reset circuit 40 is connected to the first node N1, the second initial signal terminal Vinit2 and the second gate signal terminal Gate2. The second reset circuit 40 can be configured to transmit the signal at the second initial signal terminal Vinit2 to the first node N1 in response to the signal at the second gate signal terminal Gate2. The data writing circuit 50 is connected to the first node N1, the first gate signal terminal Gate1 and the data signal terminal Data. The data writing circuit 50 can be configured to transmit the signal at the data signal terminal Data to the first node N1 in response to the signal at the first gate signal terminal Gate1. The coupling circuit 60 is connected between the first node N1 and the third node N3. The first reset circuit 30 can reset the third node N3 in the initialization stage, that is, reset the anode of the light-emitting device to eliminate the influence of the previous frame data. The second reset circuit 40 can input the voltage for turning off the driving circuit 10 to the first node N1 to avoid abnormal light emission of the light-emitting device. The data writing circuit 50 can write the data signal at the data signal terminal Data to the first node N1 in the data writing stage.

Similarly, the first reset circuit 30, the second reset circuit 40 and the data writing circuit 50 described in the present disclosure can all be implemented by transistors. For example, the first reset circuit 30 may include a fourth transistor T4. A first electrode of the fourth transistor T4 is connected to the first initial signal terminal Vinit1, a second electrode of the fourth transistor T4 is connected to the third node N3, and a gate of the fourth transistor T4 is connected to the third gate signal terminal Gate3. The fourth transistor T4 can be configured to transmit the signal at the first initial signal terminal Vinit1 to the third node N3 in response to the signal at the third gate signal terminal Gate3. The second reset circuit 40 may include a second transistor T2. A first electrode of the second transistor T2 is connected to the second initial signal terminal Vinit2, a second electrode of the second transistor T2 is connected to the first node N1, and a gate of the second transistor T2 is connected to the second gate signal terminal Gate2. The second transistor T2 can be configured to transmit the signal at the second initial signal terminal Vinit2 to the first node N1 in response to the signal at the second gate signal terminal Gate2. The data writing circuit 50 may include a first transistor T1. A first electrode of the first transistor T1 is connected to the data signal terminal Data, a second electrode of the first transistor T1 is connected to the first node N1, and a gate of the first transistor T1 is connected to the first gate signal terminal Gate1. The first transistor T1 can be configured to transmit the signal at the data signal terminal Data to the first node N1 in response to the signal at the first gate signal terminal Gate1. The first transistor T1, the second transistor T2 and the fourth transistor T4 can all be N-type transistors, for example, N-type oxide thin film transistors. Of course, in other embodiments, the first reset circuit 30, the second reset circuit 40 and the data writing circuit 50 can also have other circuit structures, which will not be described in detail here.

As shown in FIG. 1, in an example embodiment, the coupling circuit 60 may include a storage capacitor C, and the storage capacitor C can couple the voltages of each node at different stages.

Figure 2:
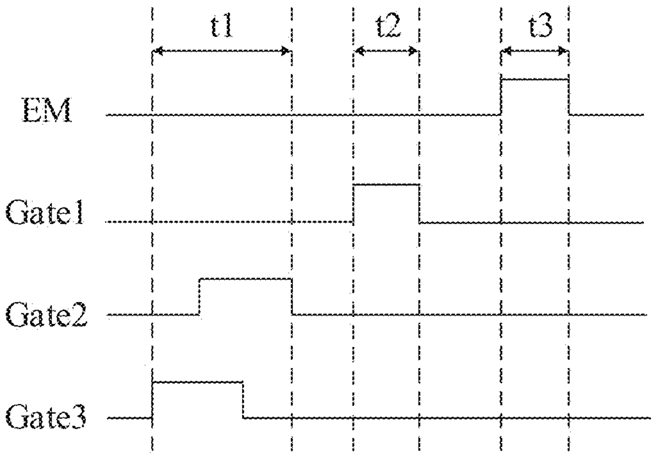
FIG. 2 is a timing diagram of each node of the pixel driving circuit in FIG. 1.

FIG. 2 is a timing diagram of each node of the pixel driving circuit in FIG. 1, in which EM represents the timing of the enable signal terminal EM, Gate1 represents the timing of the first gate signal terminal Gate1, Gate2 represents the timing of the second gate signal terminal Gate2, Gate3 represents the timing of the third gate signal terminal Gate3, and Data represents the timing of the data signal terminal Data. As shown in FIG. 2, the driving method of the pixel driving circuit may include: a reset stage t1, a data writing stage t2, and a light-emitting stage t3. The driving method of the pixel driving circuit of the present disclosure is specifically introduced below in conjunction with the timing diagram.

Figure 3:
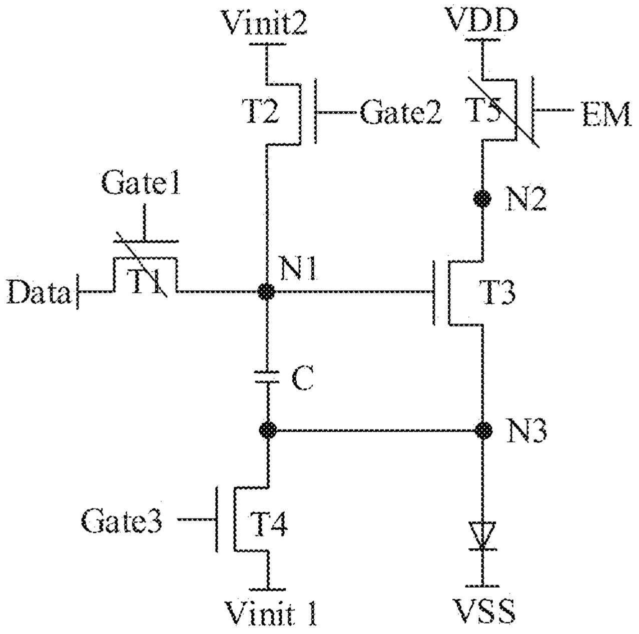
FIG. 3 is an equivalent circuit diagram of a pixel driving circuit in a reset stage according to an embodiment of the present disclosure.

FIG. 3 is an equivalent circuit diagram of a pixel driving circuit in the reset stage according to an embodiment of the present disclosure. As shown in FIG. 3, in the reset stage t1, the third gate signal terminal Gate3 and the second gate signal terminal Gate2 successively output high levels, the fourth transistor T4 and the second transistor T2 are successively turned on, and the fourth transistor T4 is turned on to transmit the initialization signal at the first initial signal terminal Vinit1 to the third node N3, and the anode of the light-emitting device is reset. The second transistor T2 is turned on to transmit the second initialization signal at the second initial signal terminal Vinit2 to the first node N1, and the first node N1 is reset.

Figure 4:
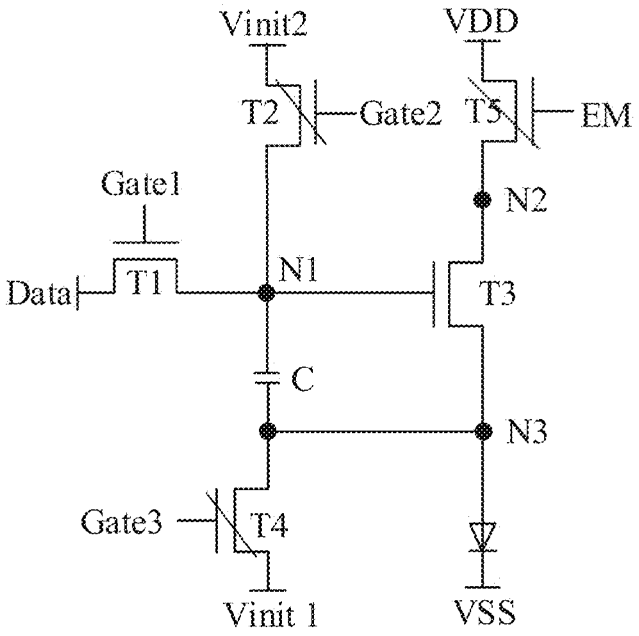
FIG. 4 is an equivalent circuit diagram of a pixel driving circuit in a data writing stage according to an embodiment of the present disclosure.

FIG. 4 is an equivalent circuit diagram of a pixel driving circuit in a data writing stage according to an embodiment of the present disclosure. As shown in FIG. 4, in the data writing stage t2, the second gate signal terminal Gate2 and the third gate signal terminal Gate3 both output low levels, and the fourth transistor T4 and the second transistor T2 are turned off. The first gate signal terminal Gate1 outputs a high-level signal, and the first transistor T1 is turned on to transmit the data signal at the data signal terminal Data to the first node N1. The voltage of the first node N1 becomes Vdata, and the voltage of the third node N3 becomes $V_{N3}$=Vinit2−Vth.

Figure 5:
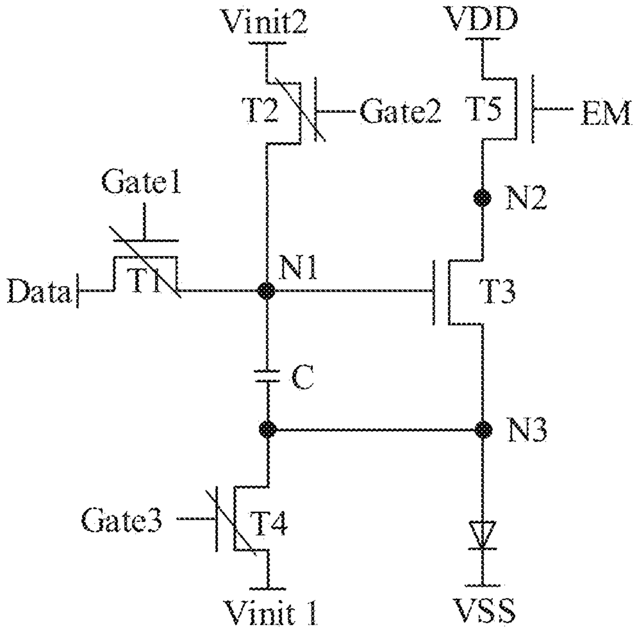
FIG. 5 is an equivalent circuit diagram of a pixel driving circuit in a light emitting stage according to an embodiment of the present disclosure.

FIG. 5 is an equivalent circuit diagram of a pixel driving circuit in a light-emitting stage according to an embodiment of the present disclosure. As shown in FIG. 5, in the light-emitting stage t3, the first transistor T1, the second transistor T2, and the fourth transistor T4 are all turned off, the enable signal terminal EM outputs a high-level signal, the fifth transistor T5 is turned on, and the voltage signal at the first power supply terminal VDD is written into the second node N2, so that the driving transistor T3 is turned on under the action of the data signal of the first node N1, and the voltage difference between the first power supply terminal VDD and the second power supply terminal VSS is used to provide a driving current to the light-emitting device, and the light-emitting device is driven to emit light. $V_{N1}=V_{Data}$+Voled+Vss−Vinit2+Vth, $V_{N3}$=Voled+Vss, according to the output current formula of the driving transistor $I=(\mu WCox/2\,L)(Vgs-Vth)^2$, where μ is the carrier mobility; Cox is the gate storage capacitance per unit area, W is the width of the driving transistor channel, L is the length of the driving transistor channel, Vgs is the gate-source voltage difference of the driving transistor, and Vth is the threshold voltage of the driving transistor. The output current I of the driving transistor in the pixel driving circuit of the present disclosure is $I=(\mu WCox/2\,L)(V_{Data}-Vinit2)^2$. The pixel driving circuit can avoid the influence of the driving transistor threshold on its output current.

Figure 6:
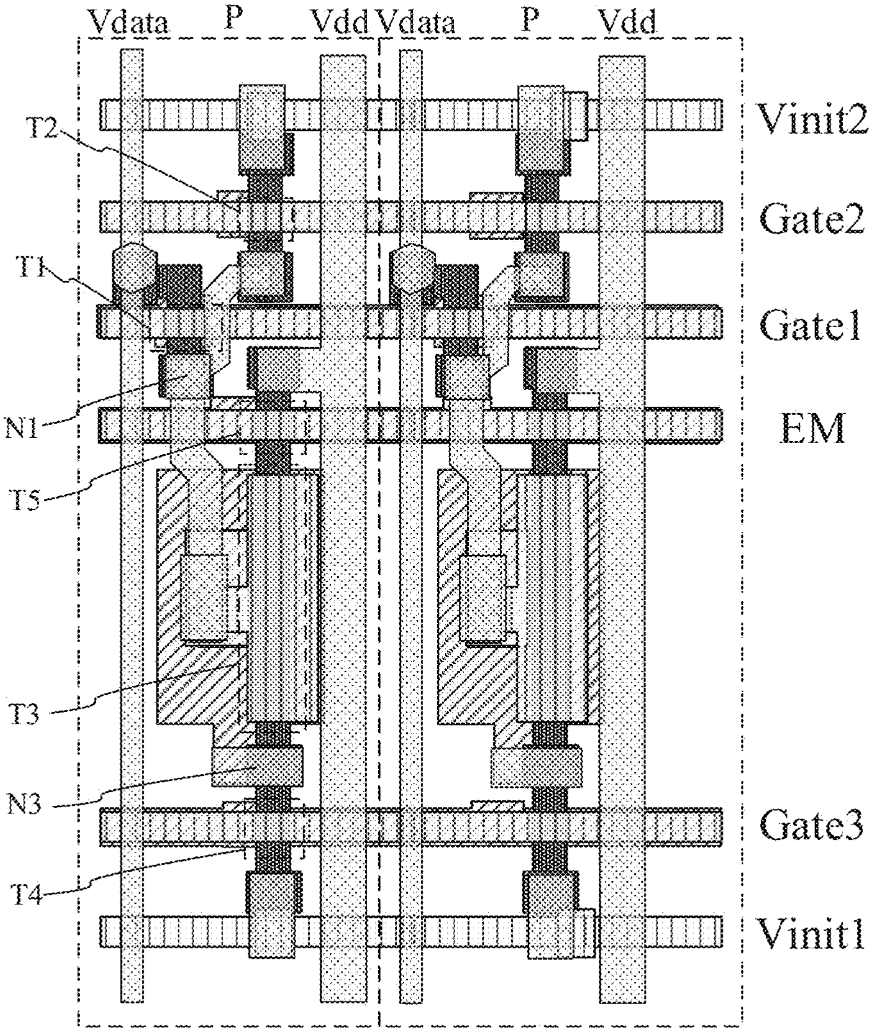
FIG. 6 is a structural layout of a display panel according to an embodiment of the present disclosure.
Figure 7:
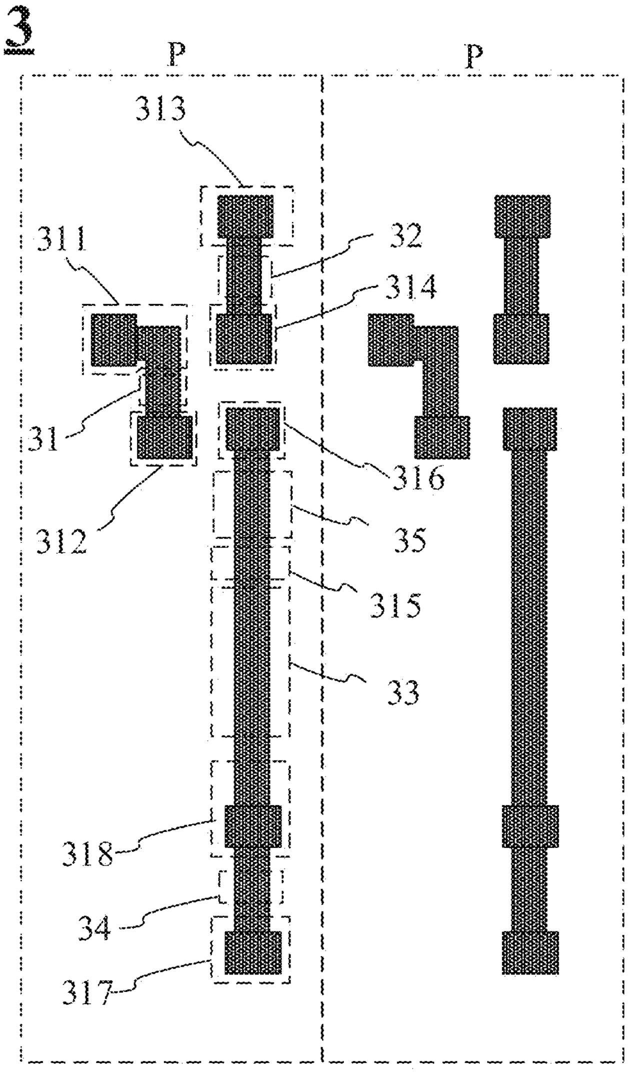
FIG. 7 is a structural layout of an active layer in FIG. 6.
Figure 8:
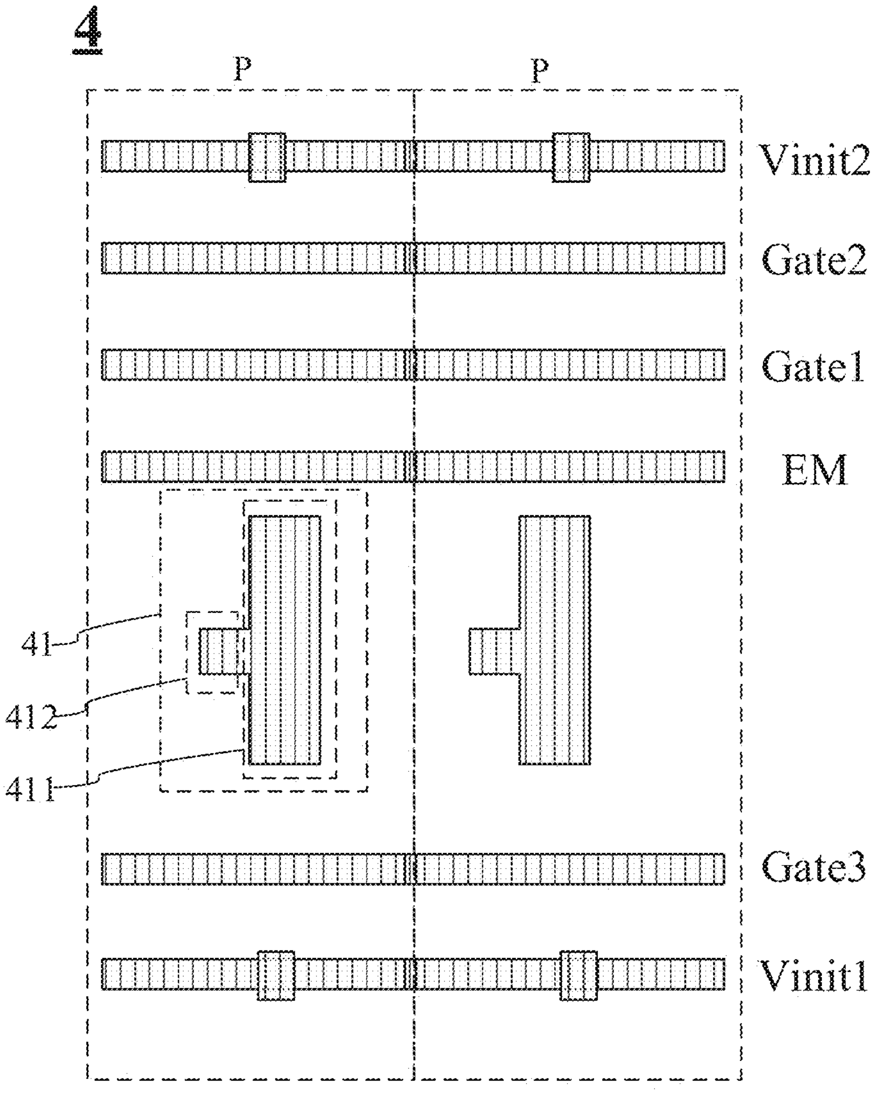
FIG. 8 is a structural layout of a third conductive layer in FIG. 6.
Figure 9:
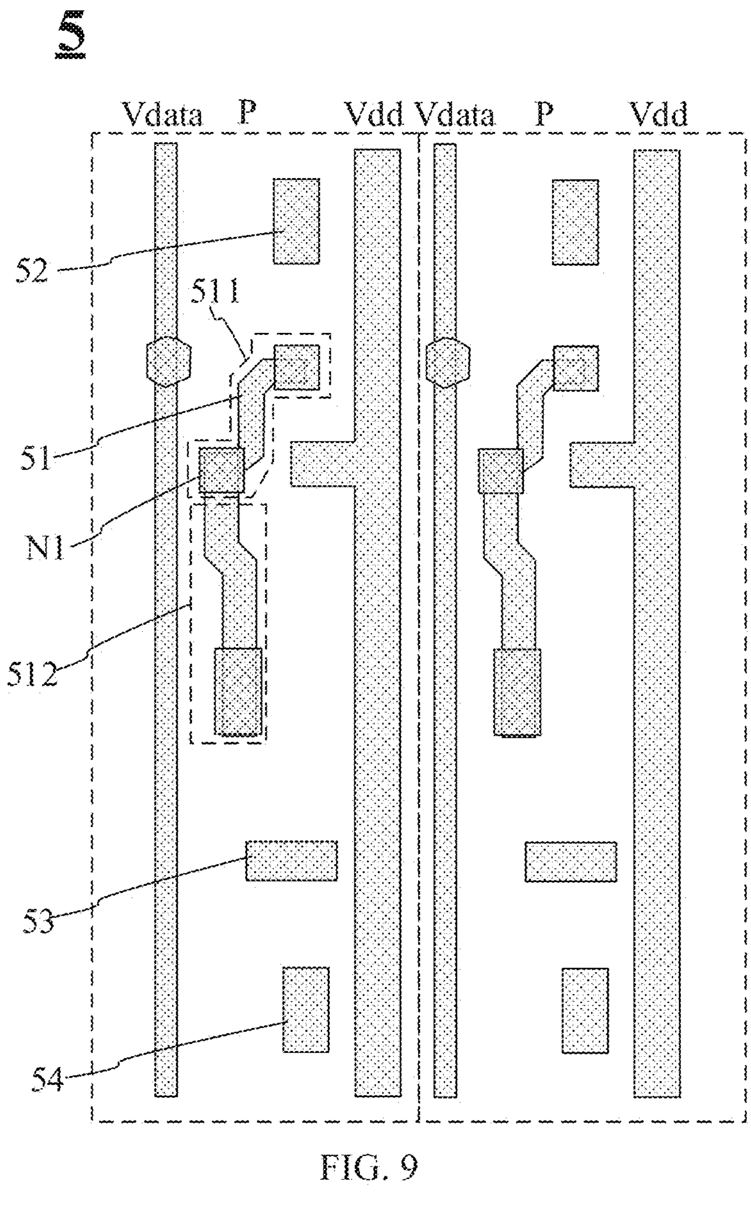
FIG. 9 is a structural layout of a fourth conductive layer in FIG. 8.

The present disclosure also provides a display panel. The display panel may include a plurality of pixel driving circuits according to any of embodiments of the present disclosure. The plurality of pixel driving circuits are distributed in an array along a first direction X and a second direction Y. The first direction X may be, for example, a row direction, and the second direction Y may be, for example, a column direction. FIG. 6 is a structural layout of a display panel according to an embodiment of the present disclosure. FIG. 7 is a structural layout of an active layer in FIG. 6. FIG. 8 is a structural layout of a third conductive layer in FIG. 6. FIG. 9 is a structural layout of a fourth conductive layer in FIG. 8. As shown in FIGS. 6 to 9, the display panel may include a substrate, an active layer 3, a third conductive layer 4, and a fourth conductive layer 5. The active layer 3 is located on one side of the substrate, and the active layer 3 may include a third active portion 33, a fifth active portion 35, a fifteenth active portion 315, and a sixteenth active portion 316. The third active portion 33 is configured to form a channel region of a driving transistor T3. The fifth active portion 35 is configured to form a channel region of a fifth transistor T5. The fifteenth active portion 315 is connected between the third active portion 33 and the fifth active portion 35, and the fifteenth active portion 315 may be configured to form a first electrode of the driving transistor T3 and a first electrode of the fifth transistor T5. The sixteenth active portion 316 is connected to a side of the fifth active portion 35 away from the fifteenth active portion 315, and the active portion 316 can be configured to form the second electrode of the fifth transistor T5. The third conductive layer 4 is located on the side of the active layer 3 away from the substrate. The third conductive layer 4 may include a first conductive portion 41 and a first enable signal line EM. The first conductive portion 41 is arranged corresponding to the third active portion 33. The orthographic projection of the first conductive portion 41 on the substrate covers the orthographic projection of the third active portion 33 on the substrate. The first conductive portion 41 can be configured to form the gate of the driving transistor T3. The orthographic projection of the first enable signal line EM on the substrate can extend along the first direction X and cover the orthographic projection of the fifth active portion 35 on the substrate. A part of the structure of the first enable signal line EM can be configured to form the top gate of the fifth transistor T5. The fourth conductive layer 5 is located on the side of the third conductive layer 4 away from the substrate. The fourth conductive layer 5 may include a first power line Vdd. The orthographic projection of the first power line Vdd on the substrate can extend along the second direction Y. The first power line Vdd is connected to the sixteenth active portion 316 at the corresponding position through a via hole.

In the display panel of the present disclosure, by forming the fifth transistor T5, the turn-on duration of the fifth transistor T5 in the light-emitting stage can be adjusted by adjusting the duty ratio of the activation level of the first enable signal line EM, thereby adjusting the driving current provided by the pixel driving circuit. Thus, the pixel driving circuit in the light-emitting stage can be actively controlled, thereby providing the possibility of adjusting the grayscale voltage of the picture displayed by the display panel. In other words, the display panel of the present disclosure can adjust the grayscale value of the display picture in the light-emitting stage since it has the fifth transistor T5.

As shown in FIGS. 6 and 7, in an example embodiment, the orthographic projection of the structure formed by sequentially connecting the sixteenth active portion 316, the fifth active portion 35, the fifteenth active portion 315, and the third active portion 33 on the substrate can extend along the second direction Y, so that the fifth transistor T5 is located on one side of the driving transistor T3 along the column direction.

It should be understood that the present disclosure refers to a certain structure A extending in the direction B as meaning that A may include a major portion and a minor portion connected to the major portion, the major portion being a line, a line segment, or a bar shaped body, the major portion extending in the direction B, and the major portion extending in the direction B for a length greater than the minor portion extending in the other direction.

The present disclosure can use the third conductive layer 4 as a mask to perform conductive treatment on the active layer 3. That is, the area covered by the third conductive layer 4 in the active layer 3 can form the channel region of the transistor, and the area not covered by the third conductive layer 4 in the active layer 3 forms a conductor structure.

The first enable signal line EM can be configured to provide the enable signal terminal EM in FIG. 1. The orthographic projection of the first enable signal line EM on the substrate can extend along the first direction X, so that part of the structure of the first enable signal line EM covers the fifth active portion 35, so that the fifth active portion 35 forms the channel region of the fifth transistor T5.

As shown in FIG. 6 and FIG. 7, in an example embodiment, the first conductive portion 41 in the third conductive layer 4 may include a first main portion 411 and a first additional portion 412. The orthographic projection of the first main portion 411 on the substrate may extend along the second direction Y and cover the orthographic projection of the third active portion 33 on the substrate. The first main portion 411 may be configured to form the gate of the driving transistor T3. The first additional portion 412 may be connected to one side of the first main portion 411 along the first direction X. The first additional portion 412 may be connected to the first electrode of the storage capacitor C through a via hole, thereby connecting the gate of the driving transistor T3 to the first electrode of the storage capacitor C.

The first power line Vdd may provide the first power terminal VDD in FIG. 1. The orthographic projection of the first power line Vdd on the substrate extends along the second direction Y. The first power line Vdd may be connected to the sixteenth active portion 316 through a via hole, thereby connecting the second electrode of the fifth transistor T5 to the first power terminal VDD.

It should be understood that the present disclosure refers to the orthographic projection of a certain structure A on the substrate covers the orthographic projection of another structure B on the substrate as meaning that the outline of the projection of B on the substrate plane is completely inside the outline of the projection of A in the same plane.

Figure 10:
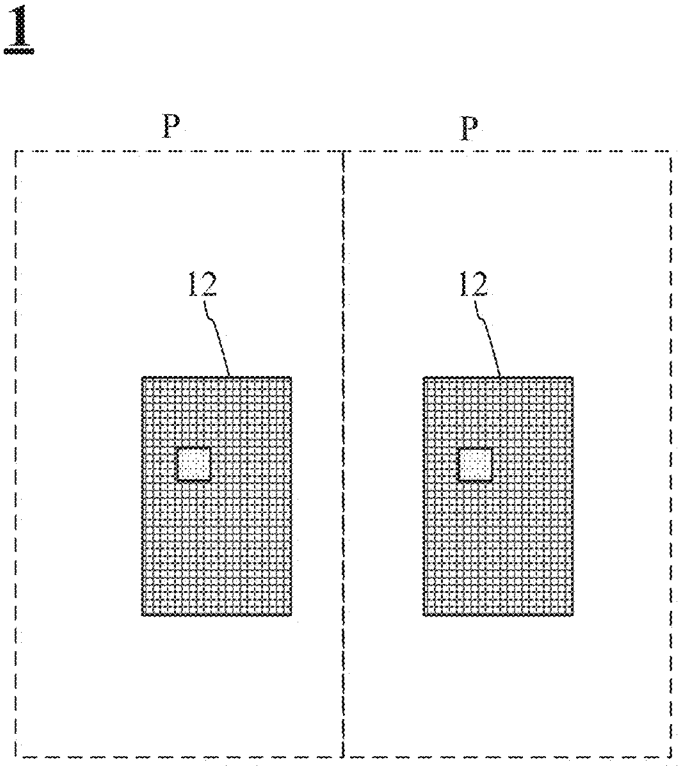
FIG. 10 is a structural layout of a first conductive layer in FIG. 6.

In addition, as shown in FIG. 6, the display panel of the present disclosure may further include a first conductive layer 1 and a second conductive layer 2. The substrate, the first conductive layer 1, the second conductive layer 2, the active layer 3, the third conductive layer 4, and the fourth conductive layer 5 are stacked in sequence, and an insulating layer may be provided between the above functional layers. The first conductive layer 1 may be a first gate metal layer (Gate1 layer), the second conductive layer 2 may be a second gate metal layer (Gate2 layer), the third conductive layer 4 may be a third gate metal layer (Gate3 layer), and the fourth conductive layer 5 may be a first metal trace layer (SD1 layer). FIG. 10 is a structural layout of the first conductive layer in FIG. 6, and FIG. 11 is a structural layout of the second conductive layer in FIG. 6.

As shown in FIG. 6 and FIG. 10, in an example embodiment, the first conductive layer 1 may include a second conductive portion 12. The second conductive portion 12 may be configured to form a first electrode of the storage capacitor C. The orthographic projection of the second conductive portion 12 on the substrate may cover the orthographic projection of the first additional portion 412 on the substrate, so that the second conductive portion 12 may be directly connected to the first additional portion 412 through a via hole at a corresponding position, and the first electrode of the storage capacitor C is connected to the gate of the driving transistor T3.

Figure 11:
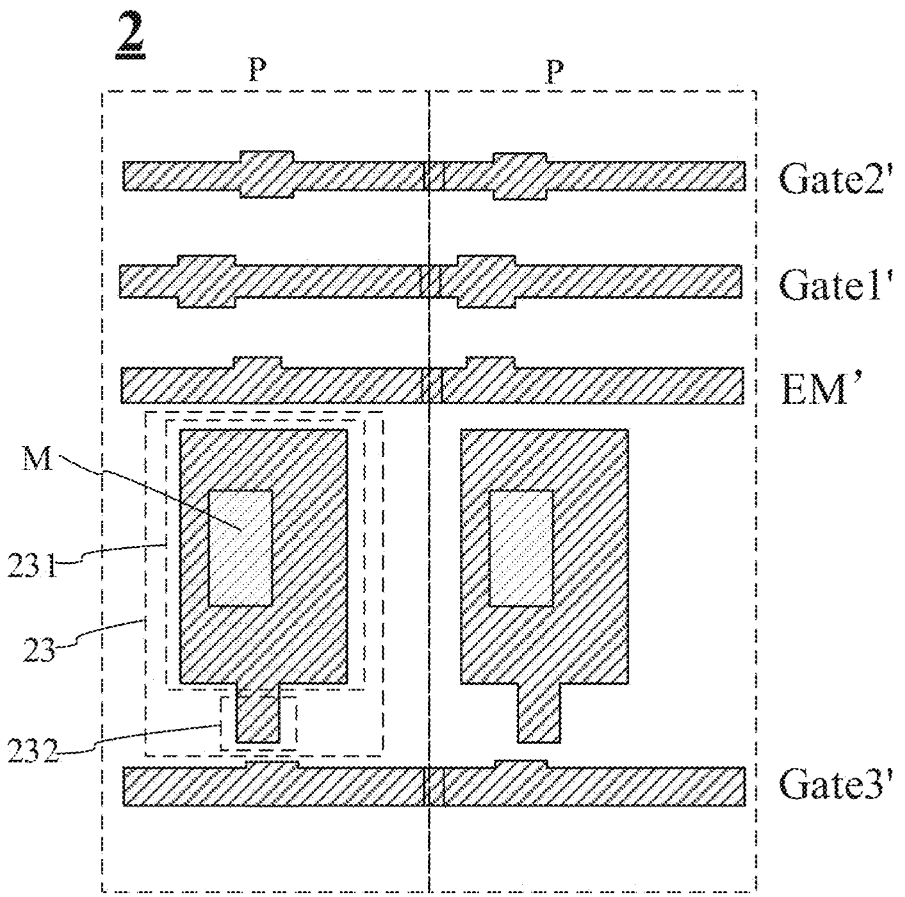
FIG. 11 is a structural layout of a second conductive layer in FIG. 6.

As shown in FIG. 6 and FIG. 11, the second conductive layer 2 may include a third conductive portion 23. The third conductive portion 23 may be configured to form a second electrode of the storage capacitor C. The third conductive portion 23 may include a second main body portion 231 and a second additional portion 232. The orthographic projection of the second main body portion 231 on the substrate may extend along the second direction Y and partially overlap with the orthographic projection of the second conductive portion 12 on the substrate. The second additional portion 232 is connected to a side of the second main body portion 231 close to the third gate signal line Gate3. The second main body 231 forms a second electrode of the storage capacitor C. The second main body 231 has an opening M, through which a part of the second conductive portion 12 can be exposed, so that the exposed second conductive portion 12 can be connected to the first additional portion 412 in the first conductive portion 41 through a via hole.

The second additional portion 232 can be connected to the third bridge portion 53 of the fourth conductive layer 5 through a via hole, so as to connect the second additional portion 232 to the third node N3 through the third bridge portion 53, so that the second electrode of the storage capacitor C is connected to the third node N3. In an example embodiment, the conductive structure forming the third node N3 in the active layer 3 can be located on the side of the third active portion 33 away from the fifth active portion 35, and accordingly, the second additional portion 232 can be located on the side of the second main body 231 away from the first enable signal line EM.

In addition, as shown in FIG. 11, the second conductive layer 2 may further include a first gate line Gate1', a second gate line Gate2', a third gate line Gate3' and a second enable signal line EM'. The second enable signal line EM', the first gate line Gate1' and the second gate line Gate2' are located on one side of the third conductive portion 23 in the second direction Y, the third gate line Gate3' is located on the other side of the third conductive portion 23 in the second direction Y. The orthographic projections of the first gate line Gate1', the second gate line Gate2', the third gate line Gate3' and the second enable signal line EM' on the substrate may all extend along the first direction X, and the second enable signal line EM', the first gate line Gate1' and the second gate line Gate2' are sequentially spaced apart along the direction away from the third conductive portion 23 in the second direction Y.

The first gate line Gate1' is arranged correspondingly to the first gate signal line Gate1 of the third conductive layer 4. The orthographic projection of the first gate line Gate1' on the substrate can partially overlap with the orthographic projection of the first gate signal line Gate1 on the substrate and cover the orthographic projection of the first active portion 31 on the substrate, so that part of the structure of the first gate line Gate1' can be configured to form the bottom gate of the first transistor T1.

The second gate line Gate2' is arranged correspondingly to the second gate signal line Gate2. The orthographic projection of the second gate line Gate2' on the substrate partially overlaps with the orthographic projection of the second gate signal line Gate2 on the substrate and covers the orthographic projection of the second active portion 32 on the substrate, so that part of the structure of the second gate line Gate2' can be configured to form the bottom gate of the second transistor T2.

The third gate line Gate3' is arranged correspondingly to the third gate signal line Gate3. The orthographic projection of the third gate line Gate3' on the substrate partially overlaps with the orthographic projection of the third gate signal line Gate3 on the substrate and covers the orthographic projection of the fourth active portion 34 on the substrate, so that part of the structure of the third gate line Gate3' can be configured to form the bottom gate of the fourth transistor T4.

The second enable signal line EM' is arranged correspondingly to the first enable signal line EM. The orthographic projection of the second enable signal line EM' on the substrate partially overlaps with the orthographic projection of the first enable signal line EM on the substrate and covers the orthographic projection of the fifth active portion 35 on the substrate, so that part of the structure of the second enable signal line EM' can be configured to form the bottom gate of the fifth transistor T5.

As shown in FIG. 6 and FIG. 7, in an example embodiment, the active layer 3 may further include a first active portion 31, a second active portion 32 and a fourth active portion 34. The first active portion 31 is configured to form a channel region of the first transistor T1. The second active portion 32 is configured to form a channel region of the second transistor T2. The fourth active portion 34 is configured to form a channel region of the fourth transistor T4. The fourth active portion 34 and the fifth active portion 35 are respectively located at both ends of the third active portion 33 to respectively connect the two ends of the driving transistor T3.

As shown in FIG. 7, the active layer 3 may further include an eleventh active portion 311 to an eighteenth active portion 318. The eleventh active portion 311 is connected to one side of the first active portion 31 to form a first electrode of the first transistor T1. The orthographic projection of the eleventh active portion 311 on the substrate may extend along the first direction X to below the data signal line Vdata, and the eleventh active portion 311 is connected to the data signal line Vdata through a via hole, and the first electrode of the first transistor T1 is connected to the data signal terminal Data. The twelfth active portion 312 is connected to the other side of the first active portion 31, and is configured to form a second electrode of the first transistor T1. The orthographic projection of the twelfth active portion 312 on the substrate can extend to the position of the first node N1 along the second direction Y, so that the twelfth active portion 312 can be connected to the first bridge portion 51 of the fourth conductive layer 5 through a via hole, so as to connect the second electrode of the first transistor T1 to the first node N1.

The thirteenth active portion 313 and the fourteenth active portion 314 are respectively connected to both sides of the second active portion 32. The thirteenth active portion 313 can be configured to form a first electrode of the second transistor T2, and the fourteenth active portion 314 can be configured to form a second electrode of the second transistor T2. The structure after the thirteenth active portion 313, the second active portion 32 and the fourteenth active portion 314 are connected can extend along the second direction Y. The fourteenth active portion 314 is located on the side of the second active portion 32 close to the third active portion 33. Correspondingly, the thirteenth active portion 313 is located on the side of the second active portion 32 away from the third active portion 33. The thirteenth active portion 313 can be connected to the second bridge portion 52 of the fourth conductive layer 5 through a via hole, so as to connect the second initial signal line Vinit2 of the third conductive layer 4 through the second bridge portion 52, thereby connecting the first electrode of the second transistor T2 to the second initial signal terminal Vinit2. The fourteenth active portion 314 can be connected to the first bridge portion 51 of the fourth conductive layer 5 through a via hole, so as to connect the second electrode of the second transistor T2 to the first node N1 through the first bridge portion 51.

The eighteenth active portion 318 is connected between the fourth active portion 34 and the third active portion 33, and is configured to form the second electrode of the fourth transistor T4 and the third node N3. The seventeenth active portion 317 is connected to the side of the fourth active portion 34 away from the third active portion 33, and is configured to form the first electrode of the fourth transistor T4. The seventeenth active portion 317 can be connected to the fourth bridge portion 54 of the fourth conductive layer 5 through a via hole, so as to connect the first electrode of the fourth transistor T4 to the first initial signal terminal Vinit1 through the fourth bridge portion 54.

As shown in FIG. 8, in an example embodiment, the third conductive layer 4 may further include a first gate signal line Gate1 to a third gate signal line Gate3 and a first initial signal line Vinit1 and a second initial signal line Vinit2. Each of the above signal lines may extend along the first direction X. The first enable signal line EM, the first gate signal line Gate1, the second gate signal line Gate2 and the second initial signal line Vinit2 are located on one side of the third conductive portion 23 in the second direction Y, and are sequentially spaced apart along a direction away from the third conductive portion 23 in the second direction Y. The third gate signal line Gate3 and the first initial signal line Vinit1 are located on the other side of the third conductive portion 23 in the second direction Y, and are spaced apart along a direction away from the third conductive portion 23 in the second direction Y.

The first gate signal line Gate1 may be configured to provide the first gate signal terminal Gate1 in FIG. 1. The orthographic projection of the first gate signal line Gate1 on the substrate covers the orthographic projection of the first active portion 31 on the substrate, and a part of the structure of the first gate signal line Gate1 is configured to form the top gate of the first transistor T1.

The second gate signal line Gate2 may be configured to provide the second gate signal terminal Gate2 in FIG. 1. The orthographic projection of the second gate signal line Gate2 on the substrate covers the orthographic projection of the second active portion 32 on the substrate, and a part of the structure of the second gate signal line Gate2 is configured to form the top gate of the second transistor T2.

The third gate signal line Gate3 can be configured to provide the third gate signal terminal Gate3 in FIG. 1. The orthographic projection of the third gate signal line Gate3 on the substrate covers the orthographic projection of the fourth active portion 34 on the substrate, and a part of the structure of the third gate signal line Gate3 is configured to form the top gate of the fourth transistor T4.

The first initial signal line Vinit1 can be configured to provide the first initial signal terminal Vinit1 in FIG. 1. The first initial signal line Vinit1 can be connected to the fourth bridge portion 54 of the fourth conductive layer 5 through a via hole to connect the first electrode of the fourth transistor T4 through the fourth bridge portion 54. The second initial signal line Vinit2 can be configured to provide the second initial signal terminal Vinit2 in FIG. 1. The second initial signal line Vinit2 can be connected to the second bridge portion 52 of the fourth conductive layer 5 through a via hole to connect the first electrode of the second transistor T2 through the second bridge portion 52.

As shown in FIG. 9, in an example embodiment, the fourth conductive layer 5 may include, in addition to the first power line Vdd, a first bridge portion 51 to a fourth bridge portion 54. The first bridge portion 51 may be configured to form the first node N1 in FIG. 1. The first bridge portion 51 may include a first sub-bridge portion 511 and a second sub-bridge portion 512. The first sub-bridge portion 511 may be bent to connect the fourteenth active portion 314 and the twelfth active portion 312 through vias, that is, to connect the second electrode of the second transistor T2 and the second electrode of the first transistor T1, respectively. The second sub-bridge portion 512 may extend along the second direction Y. One terminal of the second sub-bridge portion 512 is connected to the first sub-bridge portion 511, and the other terminal may be connected to the first additional portion 412 through a via hole to connect the gate of the driving transistor T3, thereby connecting the second electrode of the first transistor T1 and the second electrode of the second transistor T2 to the gate of the driving transistor T3 through the first sub-bridge portion 511 and the second sub-bridge portion 512.

The orthographic projection of the second bridge portion 52 on the substrate can extend along the second direction Y to connect the thirteenth active portion 313 and the second initial signal line Vinit2 through vias in the second direction Y, so as to connect the first electrode of the second transistor T2 to the second initial signal terminal Vinit2.

The orthographic projection of the third bridge portion 53 on the substrate can extend along the first direction X to connect the second additional portion 232 and the eighteenth active portion 318 through vias in the first direction X, so as to connect the second electrode of the fourth transistor T4 and the second electrode of the storage capacitor C to the third node N3.

The orthographic projection of the fourth bridge portion 54 on the substrate can extend along the second direction Y to connect the seventeenth active portion 317 and the first initial signal line Vinit1 through vias in the second direction Y, so as to connect the first electrode of the fourth transistor T4 to the first initial signal terminal Vinit1.

In addition, as shown in FIG. 9, the fourth conductive layer 5 may further include a data signal line Vdata. The orthographic projection of the data signal line Vdata on the substrate may extend along the second direction Y. The data signal line Vdata may be configured to provide the data signal terminal Data in FIG. 1. The data signal line Vdata may be connected to the eleventh active portion 311 through a via hole to be connected to the first electrode of the first transistor T1. As shown in FIG. 6, in an example embodiment, in a repeating unit, the data signal line Vdata and the first power line Vdd may be located on both sides. In other words, in the same repeating unit, other structures of the pixel driving circuit are located between the data signal line Vdata and the first power line Vdd.

Figure 12:
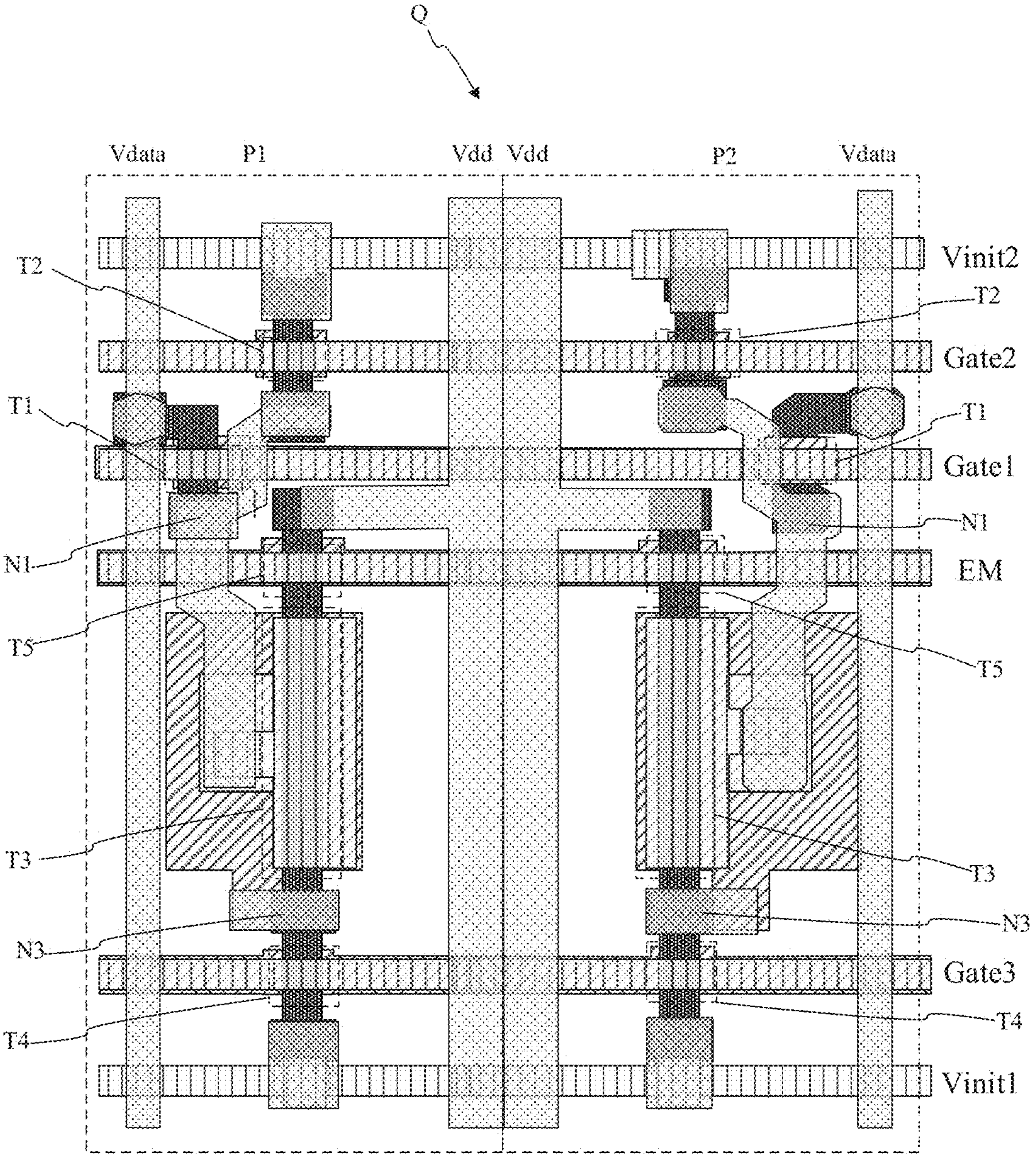
FIG. 12 is a structural layout of a display panel according to another embodiment of the present disclosure.

As shown in FIG. 6, among the multiple pixel driving circuits in the display panel of the present disclosure, one pixel driving circuit may constitute one repeating unit. In another example embodiment of the present disclosure, two pixel driving circuits may also constitute one repeating unit. For example, FIG. 12 is a structural layout diagram of a display panel according to another embodiment of the present disclosure. As shown in FIG. 12, a plurality of pixel driving circuits may include a first pixel driving circuit P1 and a second pixel driving circuit P2 adjacently distributed in the row direction X, and the first pixel driving circuit P1 and the second pixel driving circuit P2 may be arranged in mirror symmetry. The first pixel driving circuit P1 and the second pixel driving circuit P2 may form a repeating unit Q. The display panel may include a plurality of repeating units Q arranged in an array in the row direction X and the column direction Y. In two adjacent repeating units Q in the row direction, the first pixel driving circuit P1 in one repeating unit Q is arranged adjacent to the second pixel driving circuit P2 in the other adjacent repeating unit Q, and the second pixel driving circuit P2 in one repeating unit Q is arranged adjacent to the first pixel driving circuit P1 in the other repeating unit Q.

As shown in FIG. 12, in a repeating unit Q, the first pixel driving circuit P1 and the second pixel driving circuit P2 are arranged in mirror symmetry, and the first power line Vdd in the first pixel driving circuit P1 and the first power line Vdd in the second pixel driving circuit P2 can be connected as a whole. In two adjacent repeating units Q in the row direction, the first power line Vdd in the first pixel driving circuit P1 is not connected to the first power line Vdd in the second pixel driving circuit P2 in the adjacent repeating unit Q. In addition, as shown in FIG. 12, in the same repeating unit Q, the data signal line Data in the first pixel driving circuit P1 and the data signal line Data in the second pixel driving circuit P2 are not connected, and the two data signal lines Data are distributed on both sides of the two first power lines Vdd.

Figure 13:
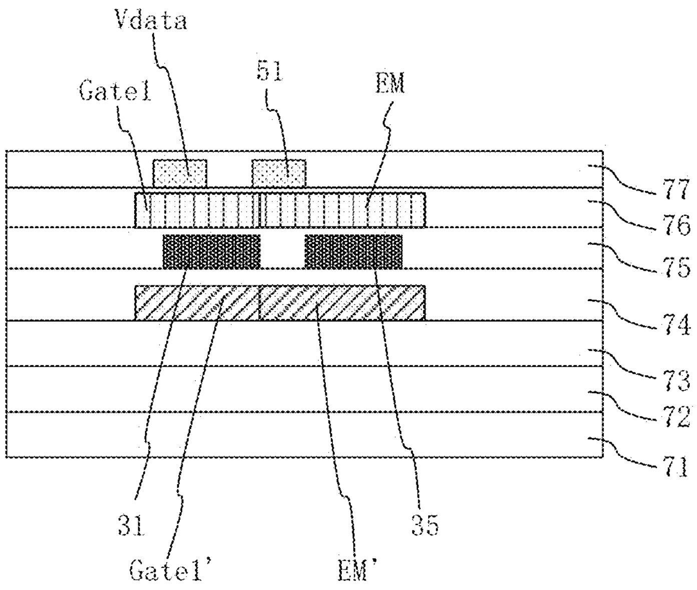
FIG. 13 is a cross-sectional view along the AA direction in FIG. 6.

FIG. 13 is a cross-sectional view along the AA direction in FIG. 6. As shown in FIG. 13, the display panel may further include a buffer layer 72, a first insulating layer 73, a second insulating layer 74, a first dielectric layer 75, and a passivation layer 76. The substrate 71, the buffer layer 72, the first conductive layer 1, the first insulating layer 73, the second conductive layer 2, the second insulating layer 74, the active layer 3, the third insulating layer 75, the third conductive layer 4, the first dielectric layer 76, the fourth conductive layer 5, and the first planarization layer 77 are stacked in sequence. The first insulating layer 73, the second insulating layer 74, and the third insulating layer 75 may be silicon oxide layers. The first dielectric layer 75 may be a silicon nitride layer. The material of the buffer layer 72 may be silicon oxide, silicon nitride, and the like. The substrate 71 may include a glass substrate, a barrier layer, and a polyimide layer stacked in sequence. The barrier layer may be an inorganic material. The materials of the first conductive layer 1, the second conductive layer 2, and the third conductive layer 4 may be one of molybdenum, aluminum, copper, titanium, and niobium, or alloys thereof, or molybdenum/titanium alloys or laminates, and the like. The material of the fourth conductive layer 5 may include a metal material, for example, one of molybdenum, aluminum, copper, titanium, niobium or an alloy thereof, or a molybdenum/titanium alloy or a laminate, or a titanium/aluminum/titanium laminate.

The present disclosure also provides a display device, which may include a display panel according to any of embodiments of the present disclosure.

After considering the specification and practicing the present disclosure, those skilled in the art will easily think of other embodiments of the present disclosure. This application is intended to cover any variation, use or adaptive change of the present disclosure, which follows the generality of the present disclosure and includes common knowledge or conventional technical means in the technical field that are not disclosed in the present disclosure. The specification and embodiments are only regarded as examples, and the true scope and spirit of the present disclosure are indicated by the claims.

What is claimed is:

1. A display panel, comprising a plurality of pixel driving circuits, wherein each pixel driving circuit comprises a driving circuit, connected to a first node, a second node and a third node, wherein the driving circuit is configured to provide a driving current using a voltage difference between the second node and the third node in response to a voltage signal at the first node; and a first control circuit, connected to the second node, a first power supply terminal and an enable signal terminal, wherein the first control circuit is configured to transmit a voltage signal at the first power supply terminal to the second node in response to a signal at the enable signal terminal, the plurality of pixel driving circuits are distributed in an array along a first direction and a second direction, the pixel driving circuit comprises a fifth transistor and a driving transistor, a first electrode of the fifth transistor is connected to the second node, a second electrode of the fifth transistor is connected to the first power supply terminal, and a gate of the fifth transistor is connected to the enable signal terminal; a first electrode of the driving transistor is connected to the second node; the pixel driving circuit is configured to drive a light-emitting unit to emit light; the display panel further comprises:

a substrate;

an active layer, located on a side of the substrate, wherein the active layer comprises:

a third active portion, wherein an orthographic projection of the third active portion on the substrate extends along the second direction, and the third active portion is configured to form a channel region of the driving transistor;

a fifth active portion, located on a side of the third active portion and configured to form a channel region of the fifth transistor;

a fifteenth active portion, connected between the third active portion and the fifth active portion, and configured to form the first electrode of the driving transistor and the first electrode of the fifth transistor; and a sixteenth active portion, connected to a side of the fifth active portion away from the fifteenth active portion, and configured to form the second electrode of the fifth transistor;

a third conductive layer located on a side of the active layer away from the substrate, wherein the third conductive layer comprises:

a first conductive portion arranged corresponding to the third active portion, wherein an orthographic projection of the first conductive portion on the substrate covers the orthographic projection of the third active portion on the substrate, and the first conductive portion is configured to form a gate of the driving transistor;

a first enable signal line, wherein an orthographic projection of the first enable signal line on the substrate extends along the first direction and covers an orthographic projection of the fifth active portion on the substrate, and a part of a structure of the first enable signal line is configured to form a top gate of the fifth transistor; and a fourth conductive layer located on a side of the third conductive layer away from the substrate, wherein the fourth conductive layer comprises:

a first power line, wherein an orthographic projection of the first power line on the substrate extends along the second direction and intersects with an orthographic projection of the sixteenth active portion on the substrate, and the first power line is connected to the sixteenth active portion at a corresponding position through a via hole.

2. The display panel according to claim 1, wherein the pixel driving circuit further comprises a fourth transistor, a first electrode of the fourth transistor is connected to a first initial signal terminal, a second electrode of the fourth transistor is connected to the third node, and a gate of the fourth transistor is connected to a third gate signal terminal; a second electrode of the driving transistor is connected to the third node;

the active layer further comprises:

a fourth active portion, located on a side of the third active portion away from the fifth active portion, and configured to form a channel region of the fourth transistor;

an eighteenth active portion, connected between the fourth active portion and the third active portion, and configured to form the second electrode of the fourth transistor and the second electrode of the driving transistor; and a seventeenth active portion, connected to a side of the fourth active portion away from the eighteenth active portion, and configured to form the first electrode of the fourth transistor;

the third conductive layer further comprises:

a third gate signal line, wherein an orthographic projection of the third gate signal line on the substrate extends along the first direction and covers an orthographic projection of the fourth active portion on the substrate, and a part of a structure of the third gate signal line is configured to form a top gate of the fourth transistor; and a first initial signal line, wherein an orthographic projection of the first initial signal line on the substrate extends along the first direction and is located on a side where the orthographic projection of the third gate signal line on the substrate is away from the orthographic projection of the third active portion on the substrate;

the fourth conductive layer further comprises:

a fourth bridge portion, wherein an orthographic projection of the fourth bridge portion on the substrate extends along the second direction, and the fourth bridge portion connects the first initial signal line and the seventeenth active portion through a via hole respectively.

3. The display panel according to claim 2, wherein the pixel driving circuit further comprises a second transistor, a first electrode of the second transistor is connected to a second initial signal line, a second electrode of the second transistor is connected to the first node, and a gate of the second transistor is connected to a second gate signal line; a gate of the driving transistor is connected to the first node;

the active layer further comprises:

a second active portion, wherein an orthographic projection of the second active portion on the substrate extends along the second direction, and the second active portion is configured to form a channel region of the second transistor;

a thirteenth active portion, connected to a side of the second active portion away from the third active portion, and configured to form the first electrode of the second transistor; and a fourteenth active portion, connected to a side of the second active portion close to the third active portion, and configured to form the second electrode of the second transistor;

the third conductive layer further comprises:

a second gate signal line, wherein an orthographic projection of the second gate signal line on the substrate extends along the first direction and is located on a side where the orthographic projection of the first enable signal line on the substrate is away from the orthographic projection of the third active portion on the substrate, the orthographic projection of the second gate signal line on the substrate covers the orthographic projection of the second active portion on the substrate, and a part of a structure of the second gate signal line is configured to form a top gate of the second transistor; and a second initial signal line, wherein an orthographic projection of the second initial signal line on the substrate extends along the first direction, and the second initial signal line is located on a side of the second gate signal line away from the first enable signal line;

the fourth conductive layer further comprises:

a first bridge portion, connected to the fourteenth active portion and the first conductive portion through a via hole respectively, to connect the second electrode of the second transistor to the gate of the driving transistor; and a second bridge portion, connected to the thirteenth active portion and the second initial signal line through a via hole respectively, to connect the first electrode of the second transistor to the second initial signal line.

4. The display panel according to claim 3, wherein the pixel driving circuit further comprises a first transistor, a first electrode of the first transistor is connected to a data signal terminal, a second electrode of the first transistor is connected to the first node, and a gate of the first transistor is connected to a first gate signal line;

the active layer further comprises:

a first active portion, configured to form a channel region of the first transistor;

an eleventh active portion, connected to a side of the first active portion, and configured to form the first electrode of the first transistor; and a twelfth active portion, connected to another side of the first active portion, and configured to form the second electrode of the first transistor, the twelfth active portion is connected to the first bridge portion through a via hole;

the third conductive layer further comprises:

a first gate signal line, wherein an orthogonal projection of the first gate signal line on the substrate extends along the first direction and covers an orthogonal projection of the first active portion on the substrate, the first gate signal line is located between the second gate signal line and the first enable signal line;

the fourth conductive layer further comprises:

a data signal line, wherein an orthogonal projection of the data signal line on the substrate extends along the second direction and is located on a side where an orthogonal projection of the third active portion on the substrate is away from an orthogonal projection of the first power line on the substrate, and the data signal line is connected to the eleventh active portion through a via hole.

5. The display panel according to claim 4, wherein the second conductive layer further comprises:

a first gate line, wherein an orthographic projection of the first gate line on the substrate extends along the first direction and partially overlaps with an orthographic projection of the first gate signal line on the substrate, the orthographic projection of the first gate line on the substrate covers an orthographic projection of the first active portion on the substrate, and a part of a structure of the first gate line is configured to form a bottom gate of the first transistor;

a second gate line, wherein an orthographic projection of the second gate line on the substrate extends along the first direction and partially overlaps with an orthographic projection of the second gate signal line on the substrate, the orthographic projection of the second gate line on the substrate covers an orthographic projection of the second active portion on the substrate, and a part of a structure of the second gate line is configured to form a bottom gate of the second transistor; and a third gate line, wherein an orthographic projection of the third gate line on the substrate extends along the first direction and partially overlaps with an orthographic projection of the third gate signal line on the substrate, the orthographic projection of the third gate line on the substrate covers an orthographic projection of the fourth active portion on the substrate, and a part of a structure of the third gate line is configured to form a bottom gate of the fourth transistor.

6. The display panel according to claim 2, wherein the pixel driving circuit further comprises a storage capacitor, a first electrode of the storage capacitor is connected to the first node, and a second electrode of the storage capacitor is connected to the third node;

the first conductive portion comprises a first main portion and a first additional portion, wherein an orthographic projection of the first main portion on the substrate extends along the second direction and covers the orthographic projection of the third active portion on the substrate, the first additional portion is connected to a side of the first main portion away from the first power line, and an orthographic projection of the first additional portion on the substrate extends along the first direction;

the display panel further comprises:

a first conductive layer, located between the substrate and the active layer, wherein the first conductive layer comprises:

a second conductive portion, arranged corresponding to the first conductive portion, the second conductive portion is configured to form the first electrode of the storage capacitor and is connected to the first additional portion through a via hole;

a second conductive layer, located between the first conductive layer and the active layer, wherein the second conductive layer comprises:

a third conductive portion configured to form the second electrode of the storage capacitor, wherein the third conductive portion comprises a second main portion and a second additional part, an orthographic projection of the second main portion on the substrate extends along the second direction and overlaps with an orthographic projection of the second conductive portion on the substrate, an orthographic projection of the second additional portion on the substrate is located between the orthographic projection of the second main portion on the substrate and the orthographic projection of the third gate signal line on the substrate;

the fourth conductive layer further comprises:

a third bridge portion, wherein an orthographic projection of the third bridge portion on the substrate extends along the first direction, and the third bridge portion connects the second additional portion and the eighteenth active portion through a via hole respectively;

wherein the second main portion has an opening for exposing a part of the second conductive portion, the orthographic projection of the first additional portion on the substrate is located within an orthographic projection of the opening on the substrate, a portion of the second conductive portion facing the opening is connected to the first additional portion through a via hole.

7. The display panel according to claim 1, wherein the pixel driving circuit further comprises:

a first reset circuit, connected to the third node, a third gate signal terminal and a first initial signal terminal, wherein the first reset circuit is configured to transmit a signal at the first initial signal terminal to the third node in response to a signal at the third gate signal terminal;

a second reset circuit, connected to the first node, a second initial signal terminal and a second gate signal terminal, wherein the second reset circuit is configured to transmit a signal at the second initial signal terminal to the first node in response to a signal at the second gate signal terminal;

a data writing circuit, connected to the first node, a first gate signal terminal and a data signal terminal, wherein the data writing circuit is configured to transmit a signal at the data signal terminal to the first node in response to a signal at the first gate signal terminal; and a coupling circuit, connected between the first node and the third node.

8. The pixel driving circuit according to claim 7, wherein, the first reset circuit comprises:

a fourth transistor, wherein a first electrode of the fourth transistor is connected to the first initial signal terminal, a second electrode of the fourth transistor is connected to the third node, a gate of the fourth transistor is connected to the third gate signal terminal, and the fourth transistor is configured to transmit the signal at the first initial signal terminal to the third node in response to the signal at the third gate signal terminal;

the second reset circuit comprises:

a second transistor, wherein a first electrode of the second transistor is connected to the second initial signal terminal, a second electrode of the second transistor is connected to the first node, a gate of the second transistor is connected to the second gate signal terminal, and the second transistor is configured to transmit the signal at the second initial signal terminal to the first node in response to the signal at the second gate signal terminal;

the data writing circuit comprises:

a first transistor, wherein a first electrode of the first transistor is connected to the data signal terminal, a second electrode of the first transistor is connected to the first node, a gate of the first transistor is connected to the first gate signal terminal, and the first transistor is configured to transmit the signal at the data signal terminal to the first node in response to the signal at the first gate signal terminal; and the coupling circuit comprises:

a storage capacitor, wherein a first electrode of the storage capacitor is connected to the first node, and a second electrode of the storage capacitor is connected to the third node.

9. The pixel driving circuit according to claim 8, wherein the fourth transistor, the second transistor and the first transistor are all N-type transistors.

10. The display panel according to claim 1, wherein the first direction is a row direction and the second direction is a column direction;

the display panel comprises a plurality of repeating units distributed along the row and column directions, the repeating unit comprises two adjacent pixel driving circuits in the row direction, and each column of the pixel driving circuits is provided with a corresponding first power line; and in a same repeating unit, two first power lines are connected.

11. The display panel according to claim 10, wherein in the same repeating unit, the two adjacent pixel driving circuits in the row direction mirror each other.

12. The display panel according to claim 1, wherein the driving circuit comprises:

a driving transistor, wherein a first electrode of the driving transistor is connected to the second node, a second electrode of the driving transistor is connected to the third node, and a gate of the driving transistor is connected to the first node, the driving transistor is configured to provide the driving current using the voltage difference between the second node and the third node in response to the voltage signal at the first node; and the first control circuit comprises:

a fifth transistor, wherein a first electrode of the fifth transistor is connected to the second node, a second electrode of the fifth transistor is connected to the first power supply terminal, and a gate of the fifth transistor is connected to the enable signal terminal, the fifth transistor is configured to transmit the voltage signal at the first power supply terminal to the second node in response to the signal at the enable signal terminal.

13. The display panel according to claim 12, wherein the driving transistor and the fifth transistor are both N-type transistors.

14. A display device, comprising the display panel according to claim 1.

15. The display panel according to claim 1, wherein an activation level of the driving circuit has a same polarity as an activation level of the first control circuit.

* * * * *